(12) United States Patent
Huissoon

(10) Patent No.: US 9,139,980 B2
(45) Date of Patent: Sep. 22, 2015

(54) MOBILE APPARATUS

(75) Inventor: Leendert Wilhelmus Cornelis Huissoon, Kruiningen (NL)

(73) Assignee: Hudson Bay Holding B.V., 's-Heer Arendskerke (NL)

( * ) Notice: Subject to any disclaimer, the term of this patent is extended or adjusted under 35 U.S.C. 154(b) by 271 days.

(21) Appl. No.: 13/700,996

(22) PCT Filed: May 31, 2011

(86) PCT No.: PCT/NL2011/000043
§ 371 (c)(1),
(2), (4) Date: Jan. 9, 2013

(87) PCT Pub. No.: WO2011/152709
PCT Pub. Date: Dec. 8, 2011

(65) Prior Publication Data
US 2013/0149095 A1  Jun. 13, 2013

(30) Foreign Application Priority Data

May 31, 2010 (NL) ..................................... 2004786
Jun. 23, 2010 (NL) ..................................... 2004954

(51) Int. Cl.
*E02F 9/16* (2006.01)
*B60R 21/13* (2006.01)
(Continued)

(52) U.S. Cl.
CPC .................. *E02F 9/163* (2013.01); *B60K 25/06* (2013.01); *B60R 21/13* (2013.01); *B62D 33/067* (2013.01); *B62D 33/0617* (2013.01); *B62D 33/0625* (2013.01); *E02F 3/301* (2013.01); *E02F 3/308* (2013.01); *E02F 3/32* (2013.01); *E02F 3/325* (2013.01); *E02F 3/38* (2013.01); *E02F 9/0875* (2013.01); *E02F 9/123* (2013.01);
(Continued)

(58) Field of Classification Search
CPC ............... B60R 21/13; B62D 33/0625; B62D 33/0617; B62D 33/067; E02F 9/2275; E02F 9/0875; E02F 9/16; E02F 9/163; E02F 9/166
USPC .................................. 180/89.1, 89.12–89.14; 296/190.03–190.07
See application file for complete search history.

(56) References Cited

U.S. PATENT DOCUMENTS 1,817,809 A * 8/1931 Eilersgaard ................ 296/181.7
2,997,333 A * 8/1961 Kauffman et al. ....... 296/190.11
(Continued)

FOREIGN PATENT DOCUMENTS

CH 697556 B1 11/2008
DE 2303685 A1 8/1974
(Continued)

OTHER PUBLICATIONS

Beate, Franck: "Mit Bier-Idee Kulmbacher Wettkonig", Frankenpost, Mar. 6, 2006, p. 3.
(Continued)

*Primary Examiner* — Ruth Ilan
(74) *Attorney, Agent, or Firm* — Bret E. Field; Daniel G. Stoddard; Bozicevic, Field & Francis LLP

(57) ABSTRACT

Mobile apparatus, comprising a main frame and a sub-frame connected in rotatable manner to the main frame, a control cab/rollover protection and an operating arm, wherein at least one recess is provided in the rollover protection/cab, which recess provides space for parts of the operating arm.

16 Claims, 13 Drawing Sheets

(51) Int. Cl.

| | | |
|---|---|---|
| *B62D 33/06* | (2006.01) | |
| *B62D 33/067* | (2006.01) | |
| *E02F 3/30* | (2006.01) | |
| *E02F 3/32* | (2006.01) | |
| *E02F 9/08* | (2006.01) | |
| *E02F 9/12* | (2006.01) | |
| *E02F 9/22* | (2006.01) | |
| *B60K 25/06* | (2006.01) | |
| *E02F 3/38* | (2006.01) | |

(52) U.S. Cl.
CPC ............... *E02F 9/128* (2013.01); *E02F 9/166* (2013.01); *E02F 9/2275* (2013.01)

(56) References Cited

U.S. PATENT DOCUMENTS

| | | | | |
|---|---|---|---|---|
| 3,963,131 A | * | 6/1976 | Dimmer | 414/697 |
| 3,964,779 A | * | 6/1976 | Benson | 296/26.15 |
| 5,232,330 A | * | 8/1993 | Rae et al. | 414/686 |
| 5,240,366 A | * | 8/1993 | Bamford | 414/686 |
| 5,470,190 A | * | 11/1995 | Bamford et al. | 414/686 |
| 6,409,457 B1 | * | 6/2002 | Korycan et al. | 414/501 |
| 6,561,572 B1 | * | 5/2003 | Martin, Jr. | 296/190.1 |
| 6,902,027 B2 | * | 6/2005 | Soga et al. | 180/308 |
| 2004/0040137 A1 | * | 3/2004 | Sewell | 29/428 |
| 2008/0282586 A1 | * | 11/2008 | Wada et al. | 37/466 |

FOREIGN PATENT DOCUMENTS

| | | |
|---|---|---|
| DE | 3834603 A1 | 4/1990 |
| EP | 1091049 A2 * | 4/2001 |
| GB | 2024113 A | 1/1980 |
| JP | 60-226922 A | 11/1985 |
| JP | 11-107316 A | 4/1999 |
| WO | WO 03/066981 A2 | 8/2003 |
| WO | WO 2010/008277 A1 | 1/2010 |

OTHER PUBLICATIONS

Muck, Menzi: "Operators Manual Menzi Muck A81 Version C(E)", Jun. 1, 2007, pp. 1-8, 63-68-101-104, http://www.menzimuck.com/de/multi/ba.html.

* cited by examiner

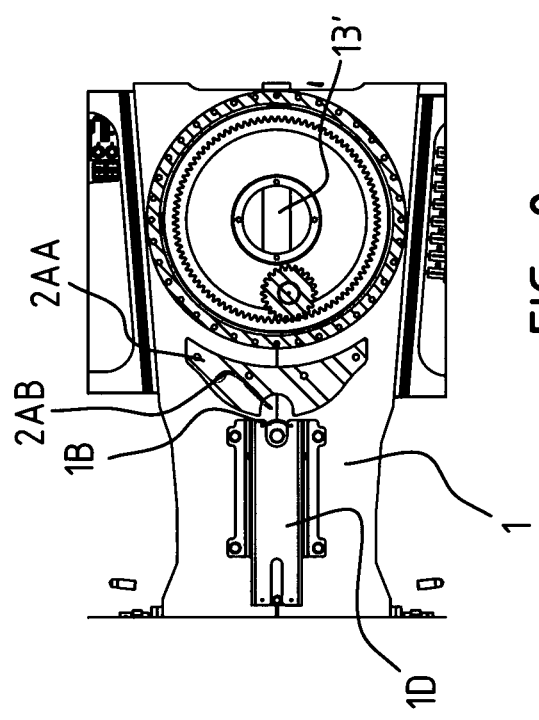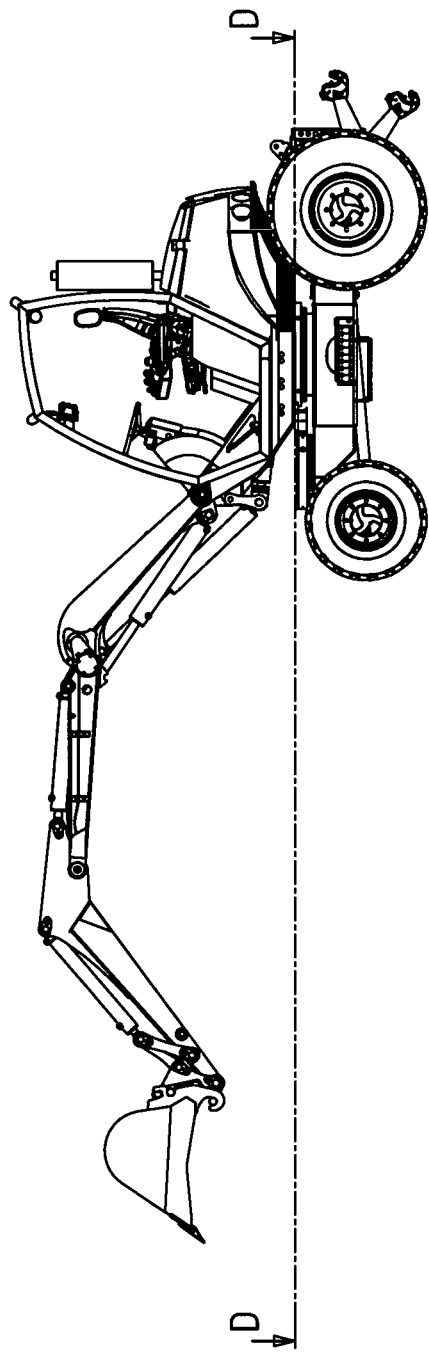
FIG. 9

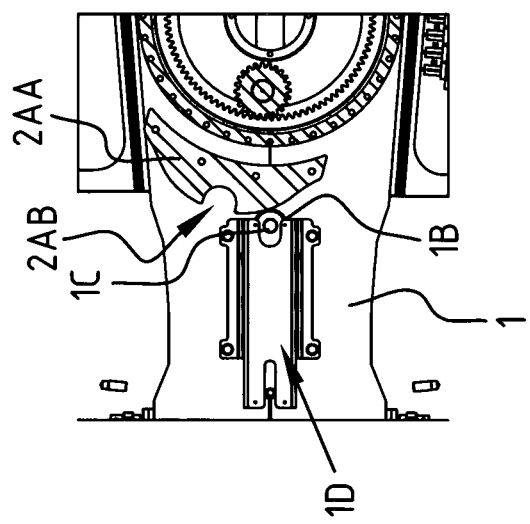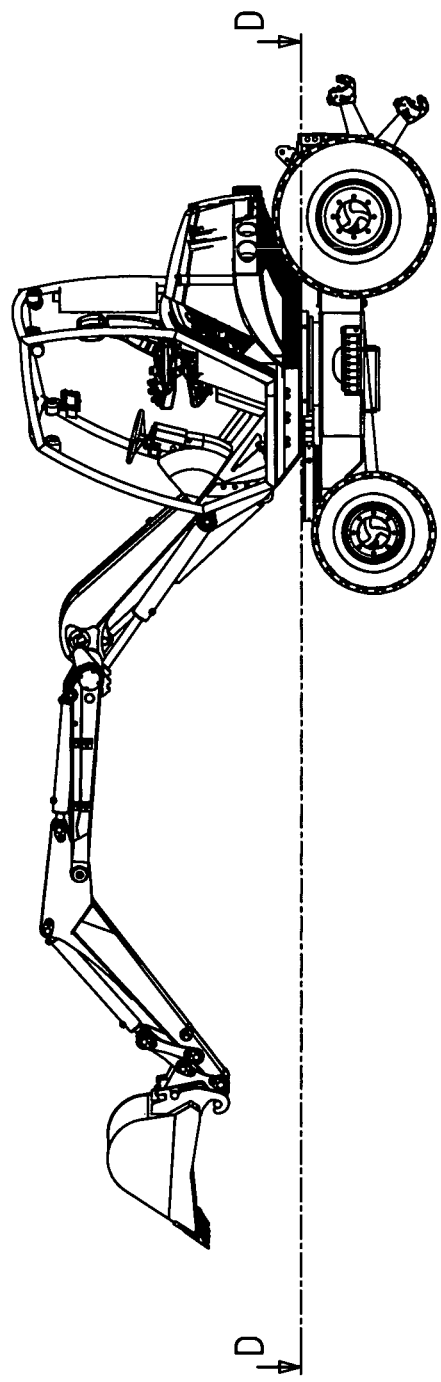
FIG. 11

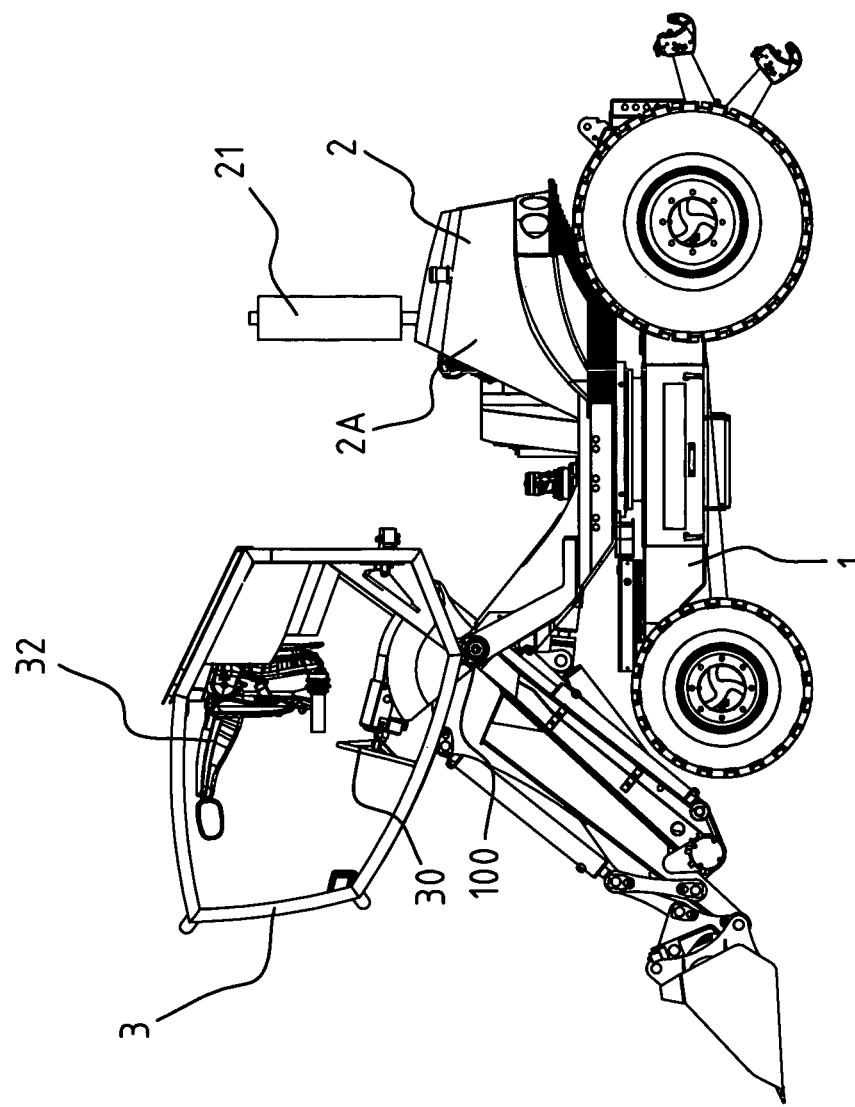
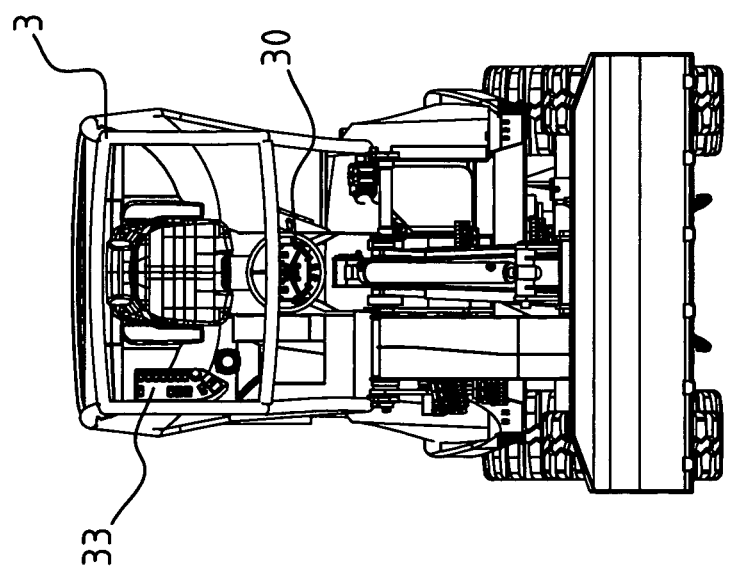
FIG. 13

MOBILE APPARATUS

The present invention relates to the field of mobile apparatuses with operating arm, such as for instance excavators.

BACKGROUND

An embodiment of a mobile apparatus with operating arm is described in detail in the European patent EP 1 472 416 and in NL 1035694, both in the name of applicant, the texts of which are incorporated here by reference.

Different improvements to such and other mobile apparatuses are possible.

SUMMARY OF THE INVENTION

Described in a first aspect of the present invention is a mobile apparatus comprising a main frame and a sub-frame connected in rotatable manner to the main frame, a control cab/rollover protection and an operating arm, wherein the control cab/rollover protection is mounted on the sub-frame for pivoting around a first rotation axis and wherein the operating arm is mounted on the sub-frame for pivoting around a second rotation axis, characterized in that the first rotation axis lies close to the second rotation axis or substantially coincides with the second rotation axis.

The mobile apparatus is preferably a mobile apparatus for earth-moving and other operations such as lifting and displacing loads. The main frame is preferably displaceable on wheels or caterpillar tracks. The operating arm is preferably adapted for coupling to an implement such as a container, a digger bucket or wrecking hammer. The mobile apparatus preferably further comprises one or more motors for driving the wheels or caterpillar tracks and moving components of the device, such as for instance the operating arm.

The first and the second rotation axis can for instance lie within a distance of 60 cm from each other, more preferably within a distance of 50 cm or 40 cm or 30 cm or 20 cm or 10 cm from each other.

The second rotation axis can have a substantially horizontal or lying orientation during use.

In other embodiments the second rotation axis can have a substantially vertical or standing orientation during use.

The operating arm of the mobile apparatus can further also comprise a horizontal or a vertical rotation axis arranged close to the second rotation axis which is respectively of the vertical or horizontal type, and wherein both rotation axes of the operating arm are arranged in the vicinity of the first rotation axis of the rollover protection/cab. These two axes of the operating arm can for instance each lie within a distance of 80 cm, more preferably within a distance of 70 cm or 60 cm or 50 cm or 40 cm or 30 cm or 20 cm or 10 cm from the rotation axis of the cab/rollover protection. These two axes of the operating arm can for instance lie within a distance of 60 cm, more preferably within a distance of 50 cm or 40 cm or 30 cm or 20 cm or 10 cm from each other.

In preferred embodiments the operating arm is an articulated operating arm. In preferred embodiments such an articulated operating arm is a foldable operating arm which, when folded together, results in a single operating arm. An example of such an operating arm is described in European patent EP 1 472 416.

The operating arm can be an articulated operating arm which consists of at least three articulations which are connected to each other for mutual pivoting on a lying axis, wherein a control member such as a hydraulic cylinder is arranged between each pair of articulations. The last, third articulation of the operating arm can have a greater length here than the second articulation such that, when the articulations are folded against each other, an attached implement can be freely used at the free end of the first articulation.

In preferred embodiments of the present invention the control cab and the operating arm are arranged and adapted such that the rotation of the rollover protection/cab round the first axis is not impeded by the operating arm during use of the mobile apparatus.

In preferred embodiments of the present invention the control cab and the operating arm are arranged and adapted such that the rotation of the operating arm around the second axis is not impeded by the rollover protection/cab during use of the mobile apparatus.

In preferred embodiments the control cab/rollover protection and the operating arm do not impede each other during rotation around their respective rotation axes during use of the mobile apparatus.

In preferred embodiments the width of the rollover protection/cab is such that the arm falls partially or wholly within the width of the rollover protection/cab. The width of the arm is preferably smaller than the width of the cab/rollover protection.

In preferred embodiments at least one recess is provided in the rollover protection/cab which provides space for parts, e.g. articulations, of the operating arm.

In preferred embodiments interior panels at the position of the driver's seat take an inclining form such that these parts can rotate away freely during rotation of the rollover protection/cab.

In preferred embodiments the suspension point about which the rollover protection/cab rotates is removable from the rollover protection/cab itself.

In preferred embodiments the suspension point about which the rollover protection/cab rotates comprises a damping device.

In preferred embodiments the cab/rollover protection is supported above the chassis by one or more control members, for instance gas springs or hydraulic cylinders.

In preferred embodiments the mobile apparatus comprises a resilient sealing means which at least partially and continuously seals the varying space between the cab and a motor space resulting from a resilient suspension of the cab/rollover protection.

This can for instance take place by adapting the shape of the cab and the shape of the motor space in suitable manner to each other and by arranging a compressible sealing edge in the space between the motor space and the control cab.

In preferred embodiments the mobile apparatus comprises an instrument panel which can be folded away (e.g. folded upward) independently of possible armrests on the driver's seat.

One or more instrument panels on one or more sides of the driver's seat can be folded upward independently of the armrests of the driver's seat so that the driver's seat is readily accessible via both sides of the rollover protection/cab.

In preferred embodiments the mobile apparatus comprises an instrument panel which can be folded away (e.g. folded upward) depending on possible armrests on the driver's seat.

In preferred embodiments the mobile apparatus comprises a steering wheel in the cab which is mounted in laterally slidable manner.

The steering wheel is preferably laterally slidable in the width direction at right angles to the longitudinal direction of the superstructure.

In preferred embodiments the mobile apparatus comprises a laterally displaceable driver's seat.

In preferred embodiments one or both of the steering wheel and (multiple) instrument panel(s) can co-displace laterally with the driver's seat.

In preferred embodiments the steering wheel and/or the instrument panels is/are multi-foldable/rotatable for better accessibility of the driver's seat or in order to allow accessibility.

In preferred embodiments the mobile apparatus further comprises a three-point lifting device, operation of which takes place with the a handle or joystick and the position/height of which is displayed on a screen via an absolute value and/or via an indication such as a gauge.

In preferred embodiments the angle between the main frame and the sub-frame can be shown on a display via an absolute value and/or via a graduated circle.

Described in a second aspect of the present invention is a mobile apparatus comprising a chassis, a control cab, an operating arm and a main motor for the travel drive of the mobile apparatus, wherein at least one power takeoff shaft for driving one or more implements (preferably in a three-point lifting device) is driven hydraulically via at least one hydraulic motor, or driven electrically via at least one electric motor, wherein the rotation speed of this power takeoff shaft is continuously variable via a control in the cab/rollover protection independently of the rotation speed of the main motor.

The mobile apparatus can further comprise one or more features as described for the mobile apparatuses of the other aspects.

In preferred embodiments the axis of the hydraulic motor or of the electric motor for driving the implements is the same as the axis of the power takeoff.

Described in a third aspect of the present invention is a mobile apparatus comprising a main frame and a sub-frame mounted on the main frame, wherein one or more openings are arranged on the side of the main frame for passage of conduits and/or cables.

The conduits or cables can serve for driving of an operating arm mounted on the sub-frame. The conduits or cables can run from the main frame (through at least one opening) via the sub-frame to the operating arm, this optionally through a swivel joint forming part of a rotating connection between main frame and sub-frame.

The mobile apparatus can further comprise one or features as described for the mobile apparatus of the other aspects.

Described in a fourth aspect of the present invention is a mobile apparatus comprising a main frame and a sub-frame and an operating arm in which hydraulic valves and/or electronic control units for controlling the operating arm, (comprised for instance in one more three-point lifting devices) are placed on the outer side of the main frame.

In preferred embodiments associated conduits and/or cables run to the hydraulic valves and/or electronic control units through the opening(s) on the side of the main frame.

In embodiments the conduits/hoses and/or cables for the valves and/or control units for controlling the operating arm run via an opening in the side of the main frame, and these valves and/or control units are arranged adjacently of the main frame.

In preferred embodiments conduits/hoses and/or cables for valves and/or control units for (for instance three-point) lifting device(s) and the power takeoff shaft are arranged adjacently of/outside the main frame, and these conduits/hoses and/or cables run through one or more openings in the main frame. They can also run further from and to the sub-frame via a swivel joint.

The mobile apparatus can further comprise one or more features as described for the mobile apparatus of the other aspects.

Described in a fifth aspect of the present invention is a mobile apparatus consisting of a main frame and a sub-frame which are mounted for rotation round a vertical axis relative to each other, the sub-frame comprising a rollover protection/control cab, wherein a blocking device is provided between the two frames and can be controlled via a control instrument in the rollover protection/cab.

The blocking can be realized by co-action between a blocking pin and a blocking means, the blocking means being fixed relative to the sub-frame and the blocking pin being fixed relative to the main frame.

When the sub-frame rotates relative to the main frame the blocking means rotates and, at a determined position of the blocking means, the pin can co-act with a recess in the blocking means and block the rotation of the sub-frame. The blocking means preferably has a guide surface of smooth form and a channel into which the pin can fit.

The positions of the blocking means and the blocking pin can also be reversed. The blocking can thus be realized by co-action between the blocking pin and the blocking means, the blocking means being fixed relative to the main frame and the blocking pin being fixed relative to the sub-frame.

When the sub-frame rotates relative to the main frame the blocking pin rotates and, at a determined position of the blocking pin, the pin can co-act with the recess in the blocking means and block the rotation of the sub-frame.

In preferred embodiments the mobile apparatus comprises hydraulic and/or electronic control units for the blocking device, and these are situated on the inner side or on the outer side of the main frame, for instance at the position of the main frame, or for instance arranged on the main frame.

In preferred embodiments the hoses/conduits or cables run to the control units for the blocking device through an opening in the main frame.

The mobile apparatus can further comprise one or more features as described for the mobile apparatus of the other aspects.

Described in a sixth aspect of the present invention is a mobile apparatus comprising a main frame, a sub-frame mounted rotatably on the main frame, a control cab mounted on the sub-frame and an operating arm, wherein the operating arm is mounted for pivoting around a rotation axis, wherein the mobile apparatus further comprises a damping means and/or the control unit of the operating arm, wherein the damping means and/or the control unit are situated at least partially in the main frame and such that they can be controlled from the rollover protection/cab via a control instrument.

The mobile apparatus can further comprise one or more features as described for the mobile apparatus of the other aspects.

Mobile apparatuses comprising one or more, or all features of mobile apparatuses according to one or more aspects as described above are also possible, as will be appreciated by a skilled person.

BRIEF DESCRIPTION OF THE DRAWINGS

The accompanying drawings are used for the purpose of illustrating embodiments of the present invention.

FIGS. 9, 10, 11 and 12 show different positions of a blocking mechanism according to embodiments of the present invention.

FIG. 13 shows a mobile apparatus with a foldable operating arm (such as for instance of the type described in EP 1 472 416) which is further provided with aspects according to the present invention.

Reference numerals are chosen such that they are the same for similar or the same elements or features in different figures or drawings.

DESCRIPTION OF ILLUSTRATIVE EMBODIMENTS

The above stated and other advantageous features and objects of the invention will become more apparent, and the invention better understood, from the following detailed description when read in combination with the respective drawings.

The description of the aspects of the present invention is completed by means of specific embodiments and with reference to, but not limited to, specific drawings. The shown figures are only schematic and should not be deemed as limitative. Determined elements or features may for instance be represented out of proportion or scale in relation to other elements.

Figure 1:
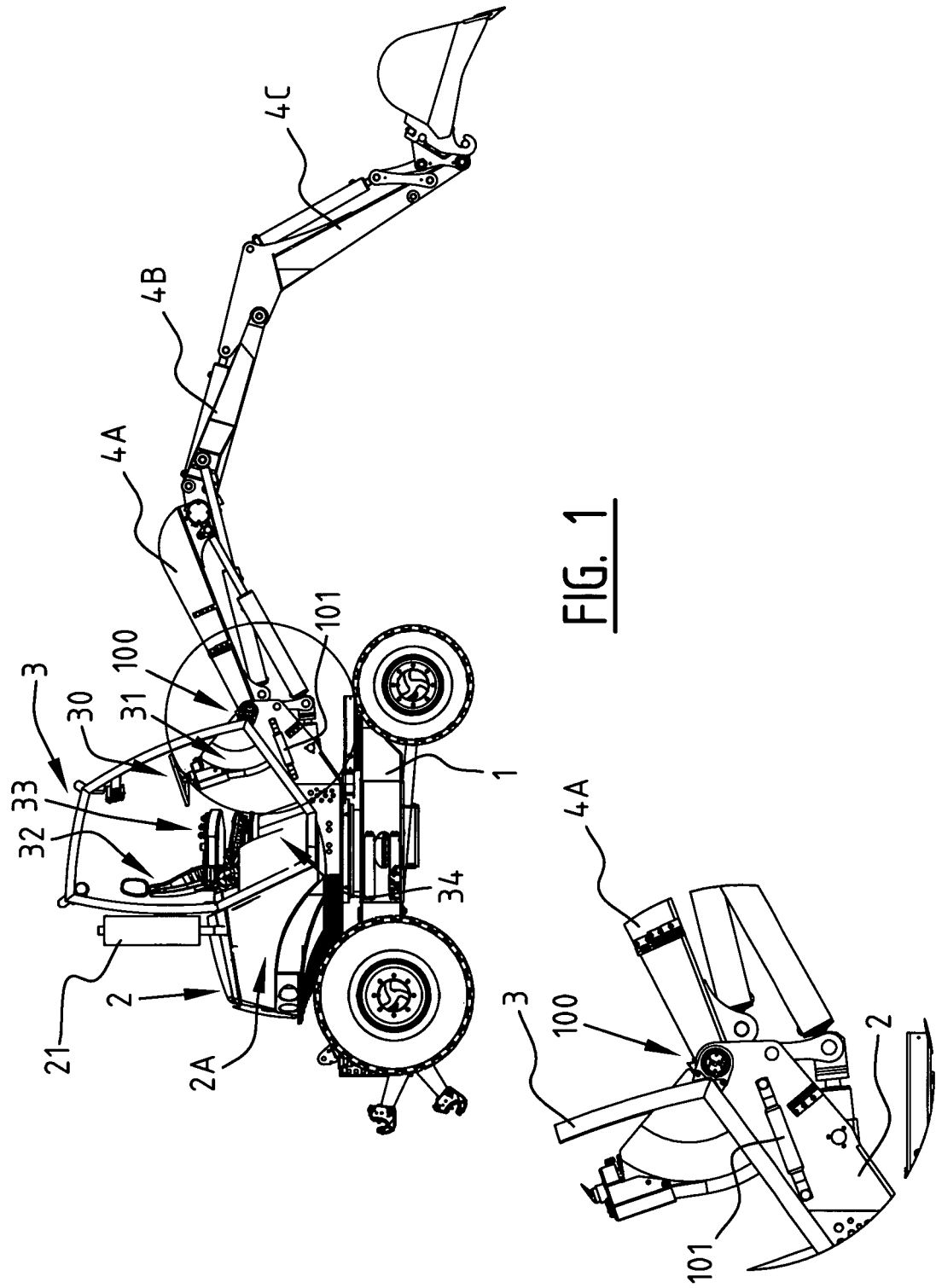
FIG. 1 illustrates a mobile apparatus according to embodiments of the present invention.
Figure 2:
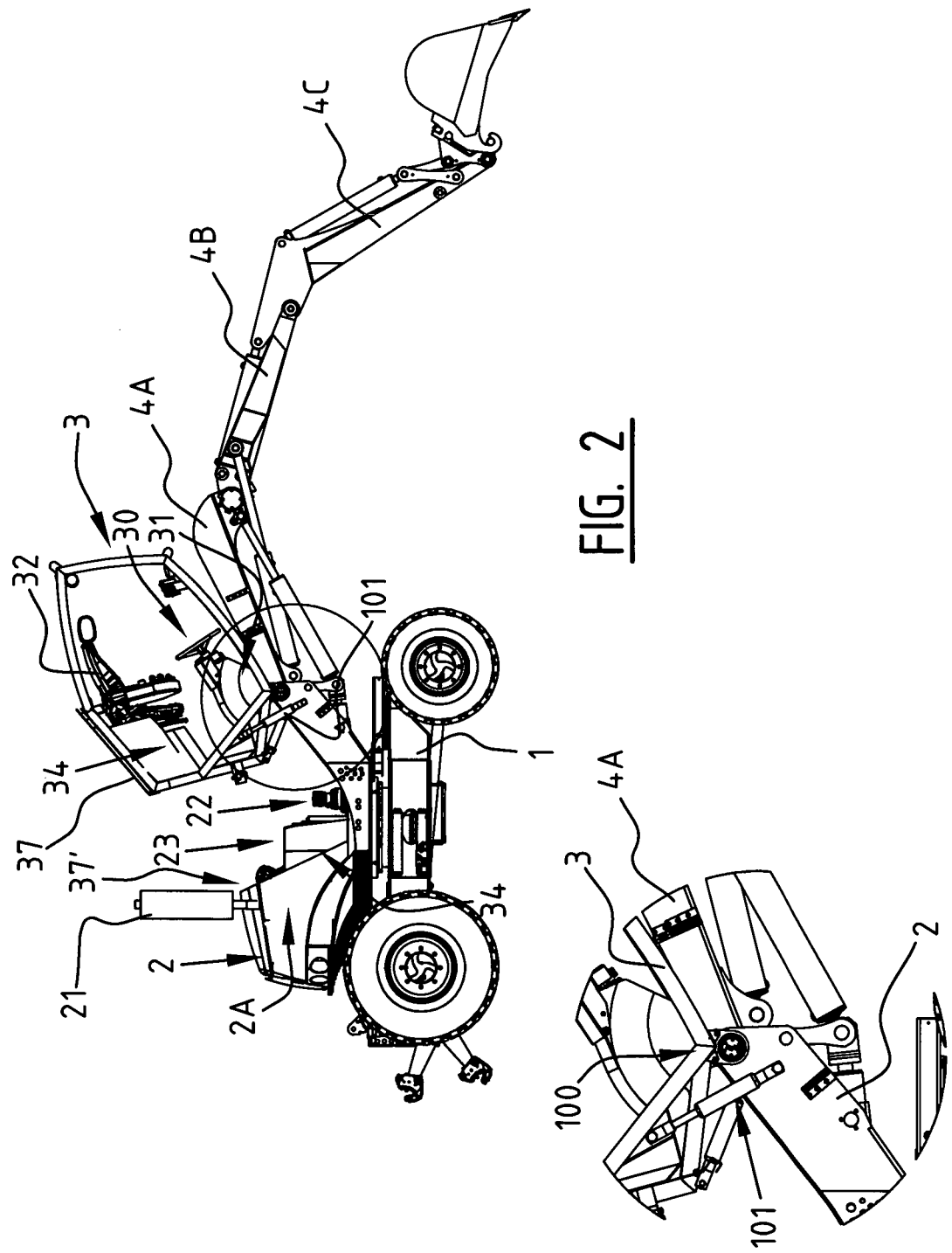
FIG. 2 illustrates the same mobile apparatus as shown in FIG. 1, wherein the cab/rollover protection is shown in a rotated position.
Figure 3:
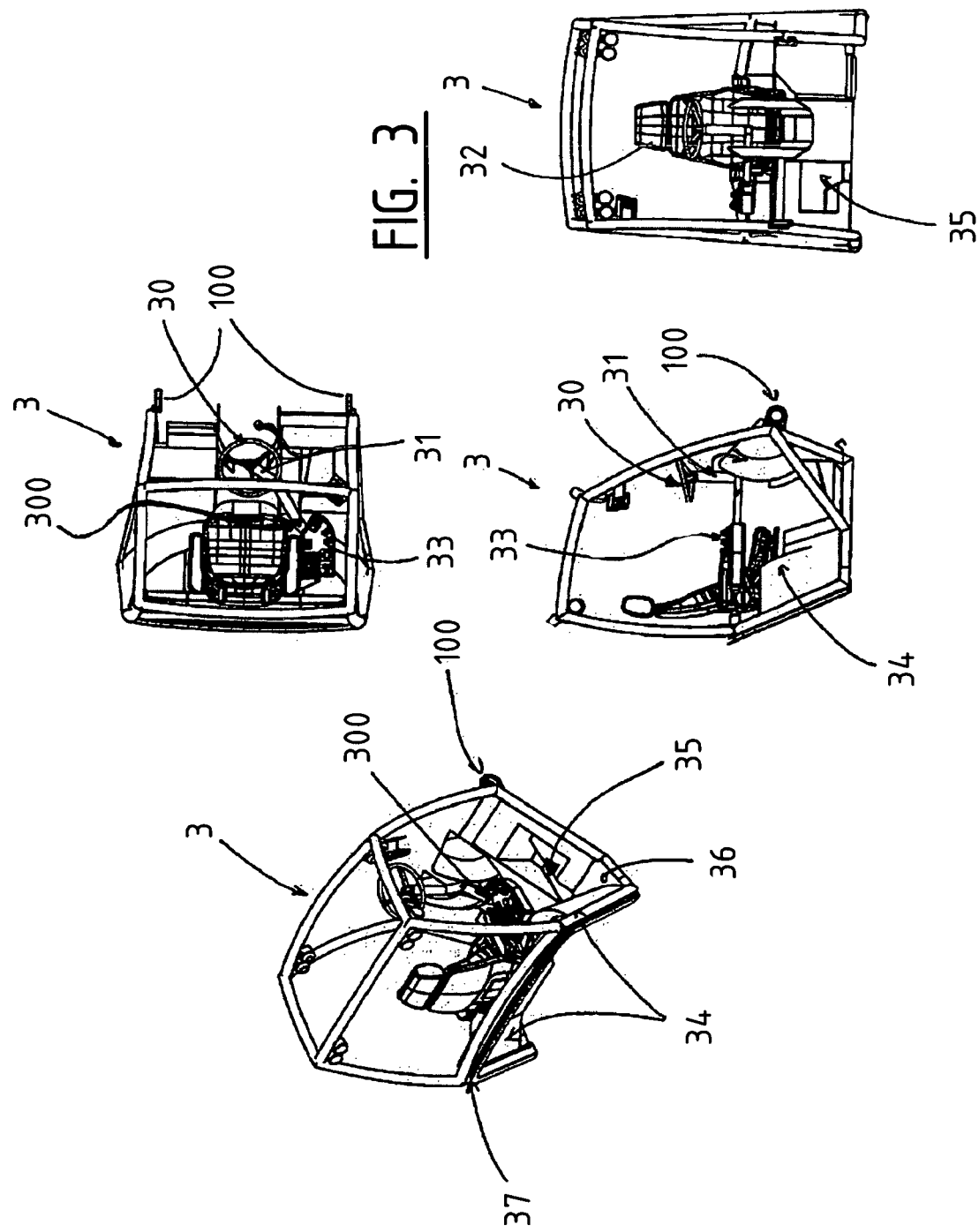
FIGS. 3 and 4 show different aspects of a cab/rollover protection in accordance with the aspects of the present invention.
Figure 4:
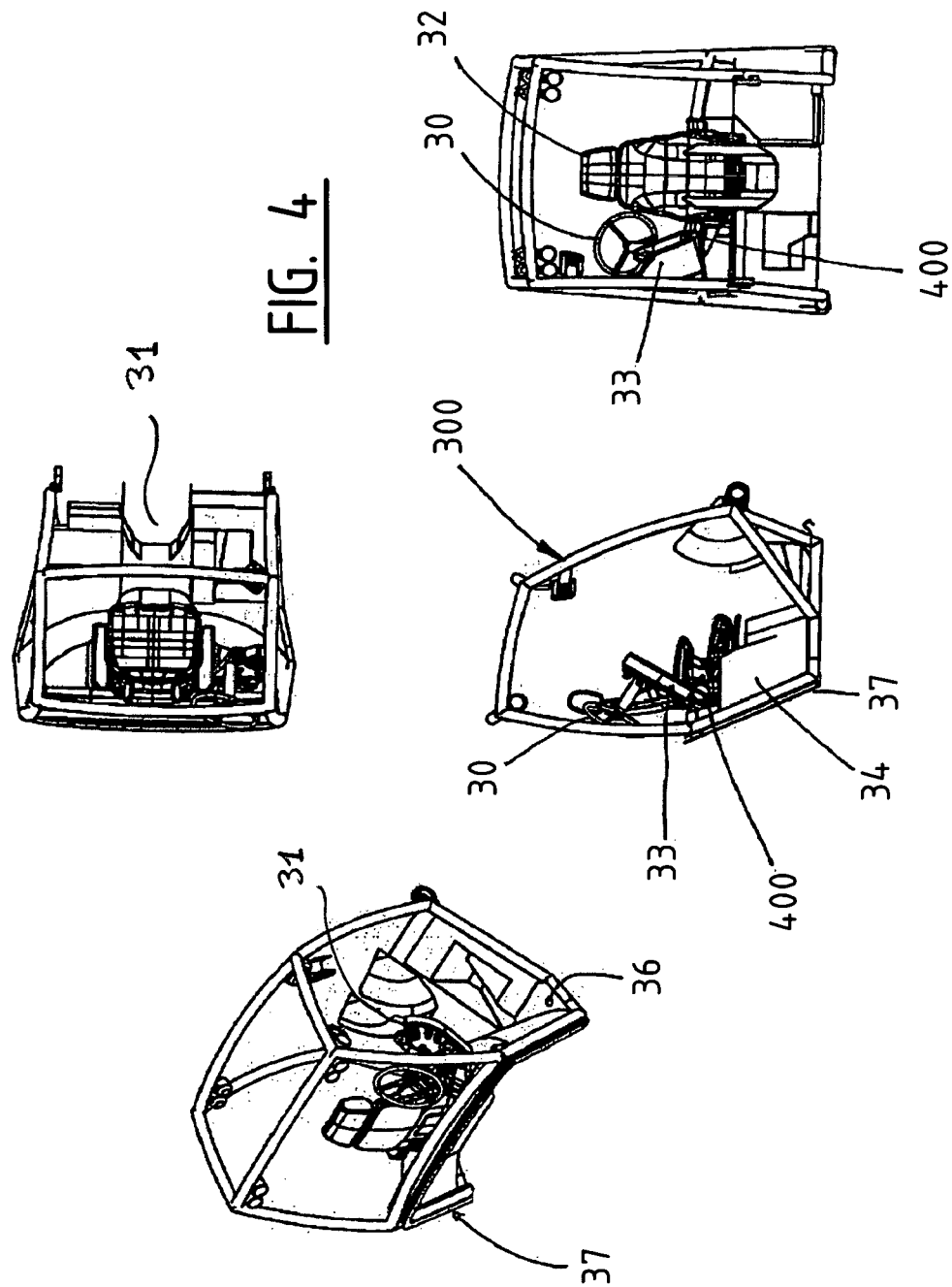

FIG. 1 shows a mobile apparatus according to embodiments of the present invention. This mobile apparatus comprises a foldable operating arm comprising three articulations 4A, 4B, 4C connected pivotally to each other. An implement can be attached to the free outer end of third articulation 4, while at a first outer end of first articulation 4A the operating arm is coupled to a sub-frame 2 which is connected rotatably to a main frame 1. Pivot axis 100 of the operating arm here coincides with the pivot axis of a cab/rollover protection (frame 3). The cab/rollover protection 3 can thus be rotated round axis 100. The mobile apparatus further comprises a motor space 2A in which a plurality of drive motors can be accommodated, in particular the main motor which provides for driving of the wheels. The mobile apparatus further comprises an exhaust silencer 21, a steering wheel 30 and a recess 31 for parts of the operating arm in the single operating arm position (when it is folded together) or in the extended position of the operating arm. The mobile apparatus further comprises a driver's seat 32 and at least one control panel 33 in driver's cab 3. The mobile apparatus further comprises parts of the cab/rollover protection/floor plate which are arranged at an incline. The mobile apparatus further comprises a control member, such as for instance a gas spring, steel spring and so forth. FIG. 2 shows the same mobile apparatus as FIG. 1, wherein the cab/rollover protection has been rotated round axis 100. Further shown in this figure is an insulating means 37, 37' arranged between motor space 2A and cab 3 in order to thus continuously insulate cab 3 from sound and heat from motor space 2A. FIG. 3 shows further aspects of the cab, as does FIG. 4. A space 35 is provided for the right foot. The point of attachment between cab/rollover protection and the sub-frame, and possibly also the point of attachment of a spring unit 36 are illustrated. These figures further illustrate the aspect of the present invention of a steering wheel 30 comprising a tilting point/rotation point. FIG. 4 shows a possible tilting point/rotation point 400 of a control panel 33.

Figure 5:
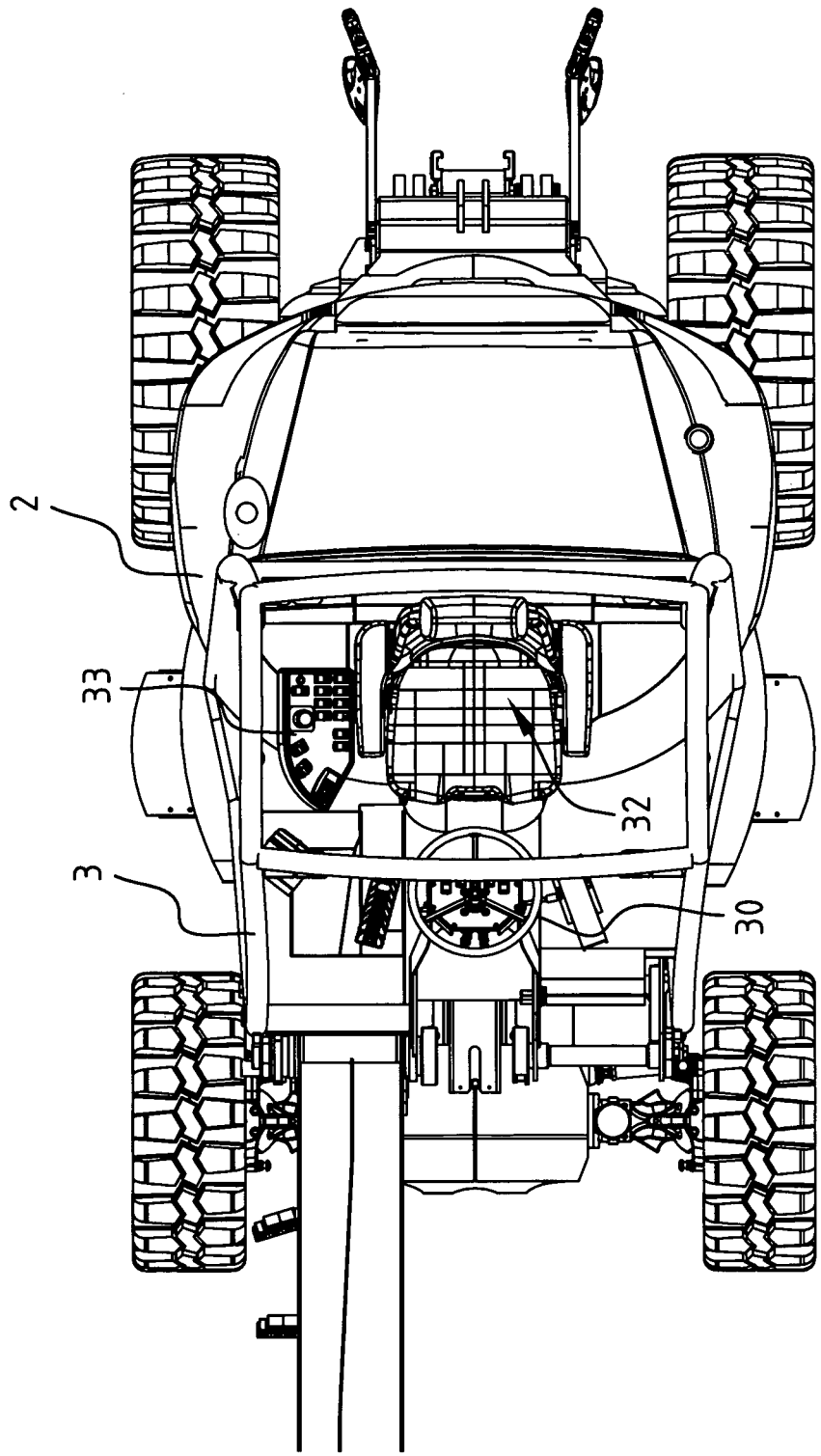
FIGS. 5 and 6 show a mobile apparatus which, according to aspects of the present invention, comprises a driver's seat slidable in the width direction.
Figure 6:
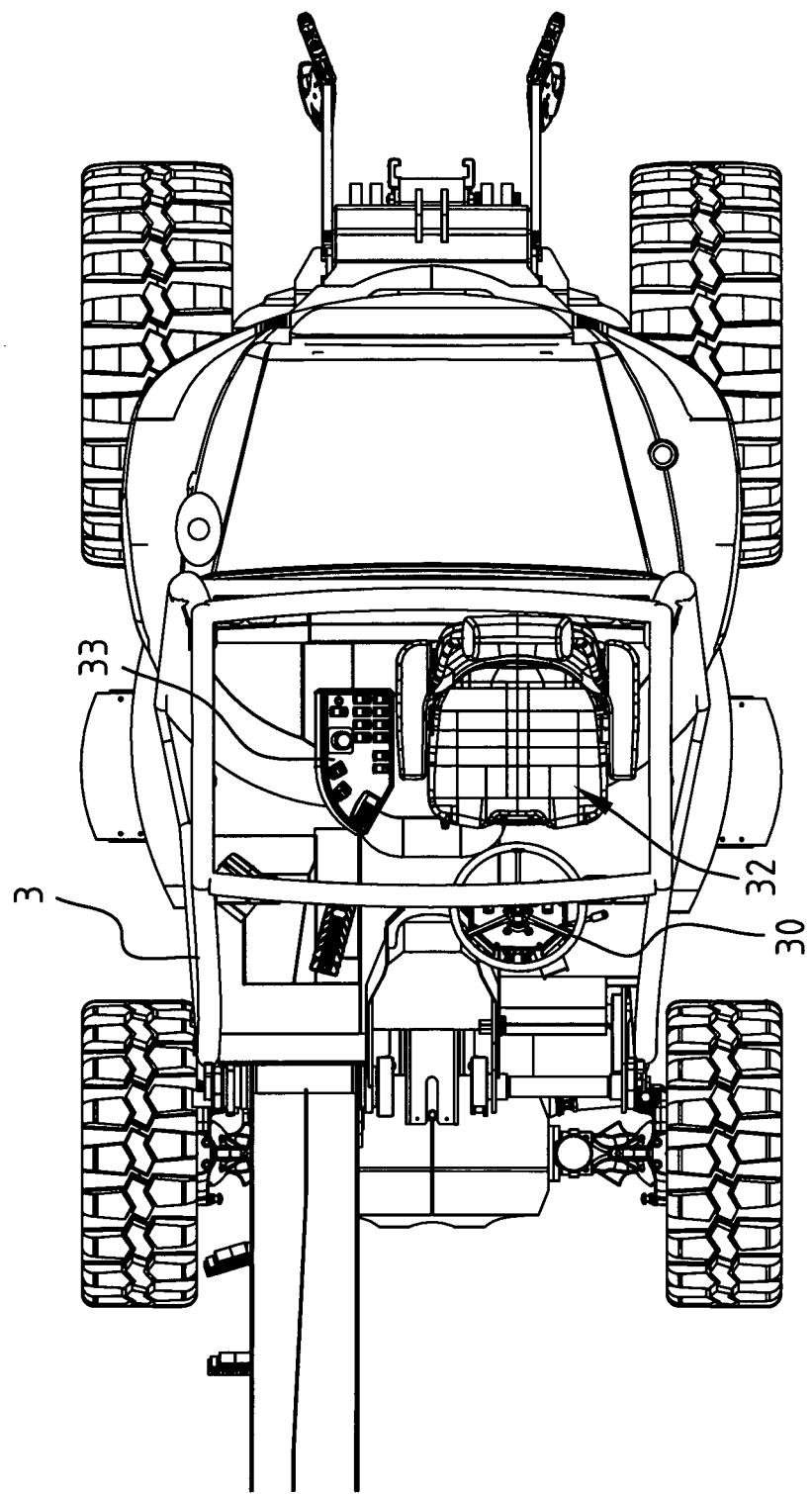

FIGS. 5 and 6 illustrate a mobile apparatus with a cab mounted on top of the sub-frame, wherein the cab comprises a driver's seat 32. In FIG. 5 this seat is positioned centrally in the driver's cab, while in FIG. 6 it has been displaced to a position left of centre. In this embodiment steering wheel 30 and control panel 33 are also displaced together with driver's seat 32.

Figure 7:
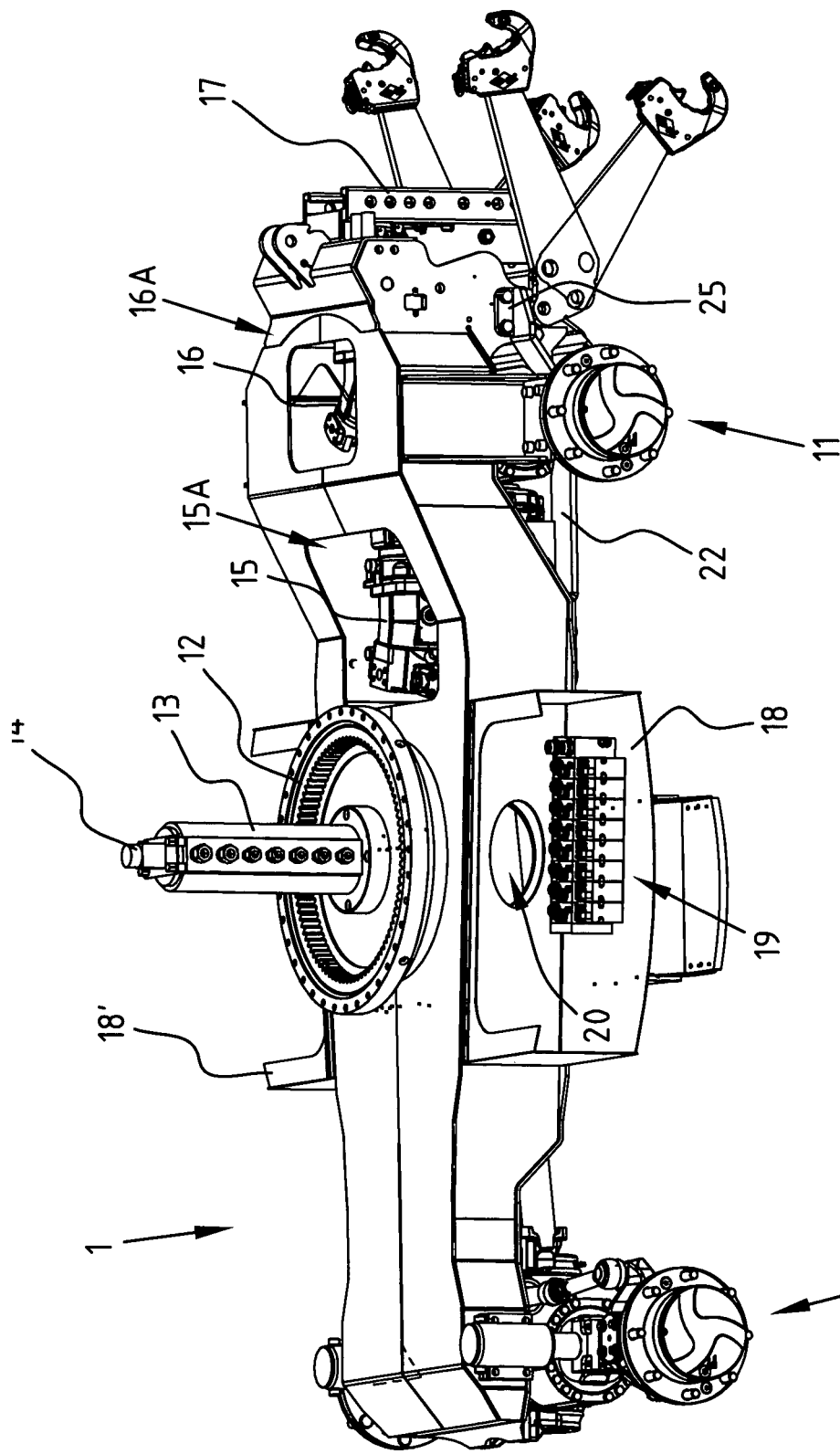
FIG. 7 shows a main frame of a mobile apparatus according to embodiments of the present invention, wherein at least one hole is provided in the main frame through which possible conduits and/or cables can be carried to the sub-frame.

FIG. 7 shows a main frame of a mobile apparatus according to embodiments of the present invention. This main frame comprises a front axle 10, a rear axle 11 and a gear ring 12. Further provided centrally relative to the gear ring is a rotating feed 13, which comprises slide contacts 14, as well as couplings for hydraulic conduits. Travel motor 15 is arranged in an opening in frame 15A. A power takeoff motor 16 is arranged in a corresponding opening 16A in the frame for this power takeoff motor. The power takeoff motor is preferably driven by the main motor. The main frame further also comprises a tow hook frame 17. Protective covers 18 and 18' for components, such as for instance hydraulic valves 19, are comprised on either side of the main frame. According to the embodiment of the present invention the main frame comprises at least one hole 20 which opens out from the protective cover for components into an internal space in the main frame. Conduits or cables can be fed through such an opening in the direction of the sub-frame and potentially further in the direction of the operating arm. An additional mounting 22 of an axle to the main frame is shown, as well as a fixing point 25 for a three-point lifting frame.

Figure 8:
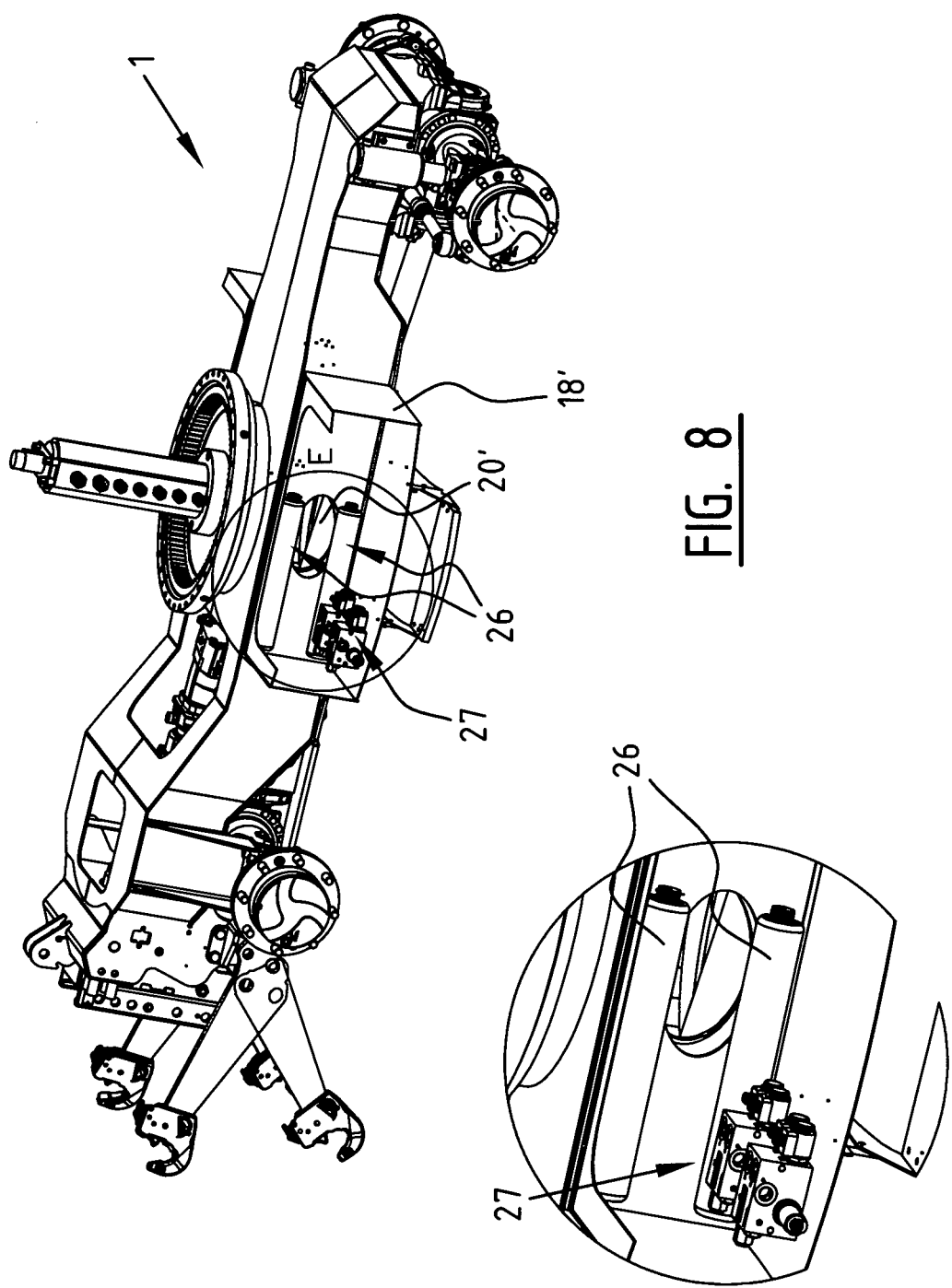
FIG. 8 shows another perspective view of a main frame.

FIG. 8 shows a similar chassis, be it from a different perspective. A hole 20' is present in the main frame. Accumulators/damping means 26 are further arranged on the main frame, protected by a protective cover 18', which form part of a damping mechanism for the operating arm. Control units 27 for damping and/or stabilizing the front axle are further arranged in protective cover 18 at the position of the main frame.

FIGS. 9, 10, 11 and 12 show a mechanism for blocking the rotation of the sub-frame relative to the main frame. The mechanism comprises a catch or wheel 1B which can drop into blockings 2AB and 2AA, wherein 2AB is a channel of blocking and 2AA a blocking device. 13' represents the rotation point of the sub-frame relative to the main frame.

Figure 10:
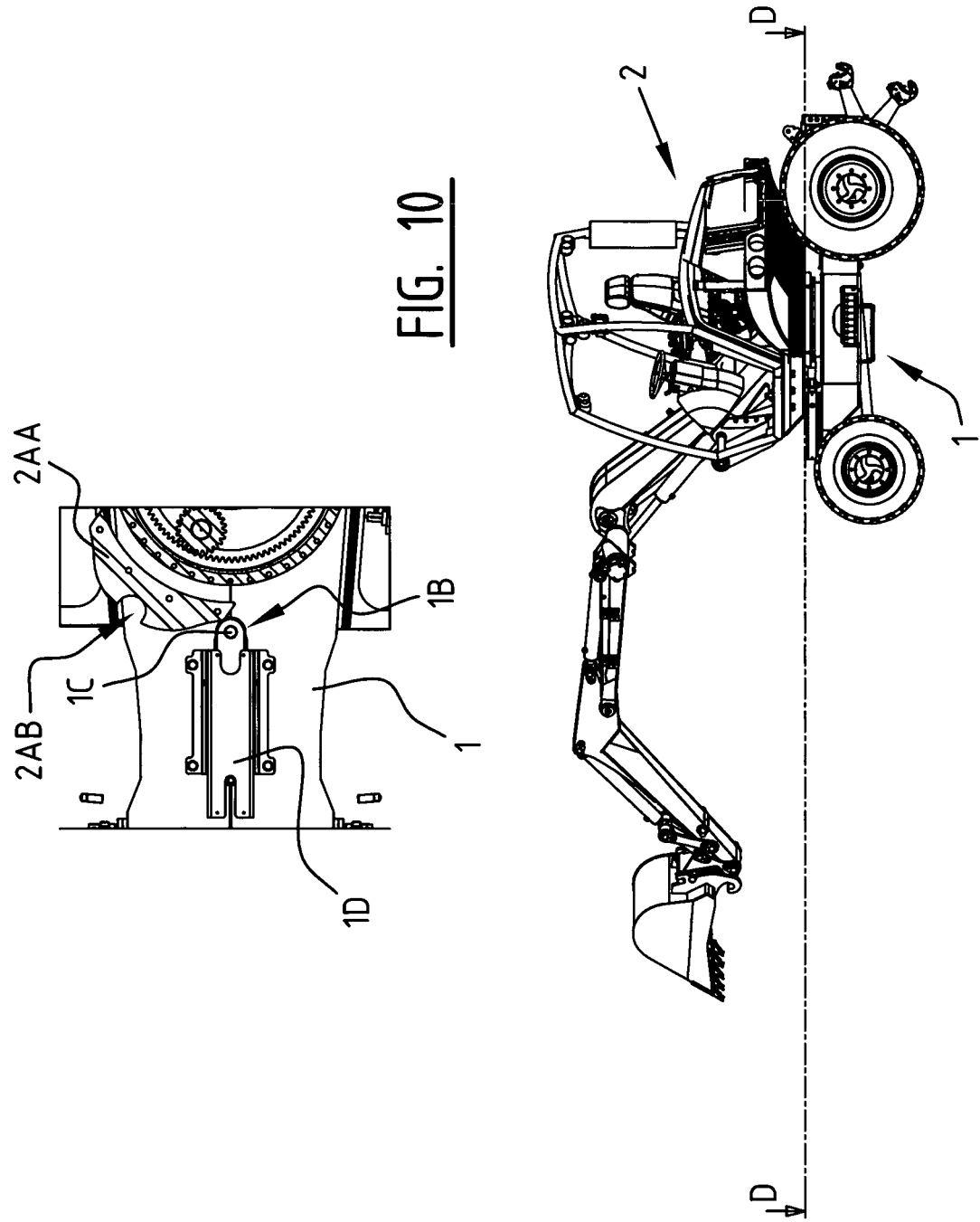
Figure 12:
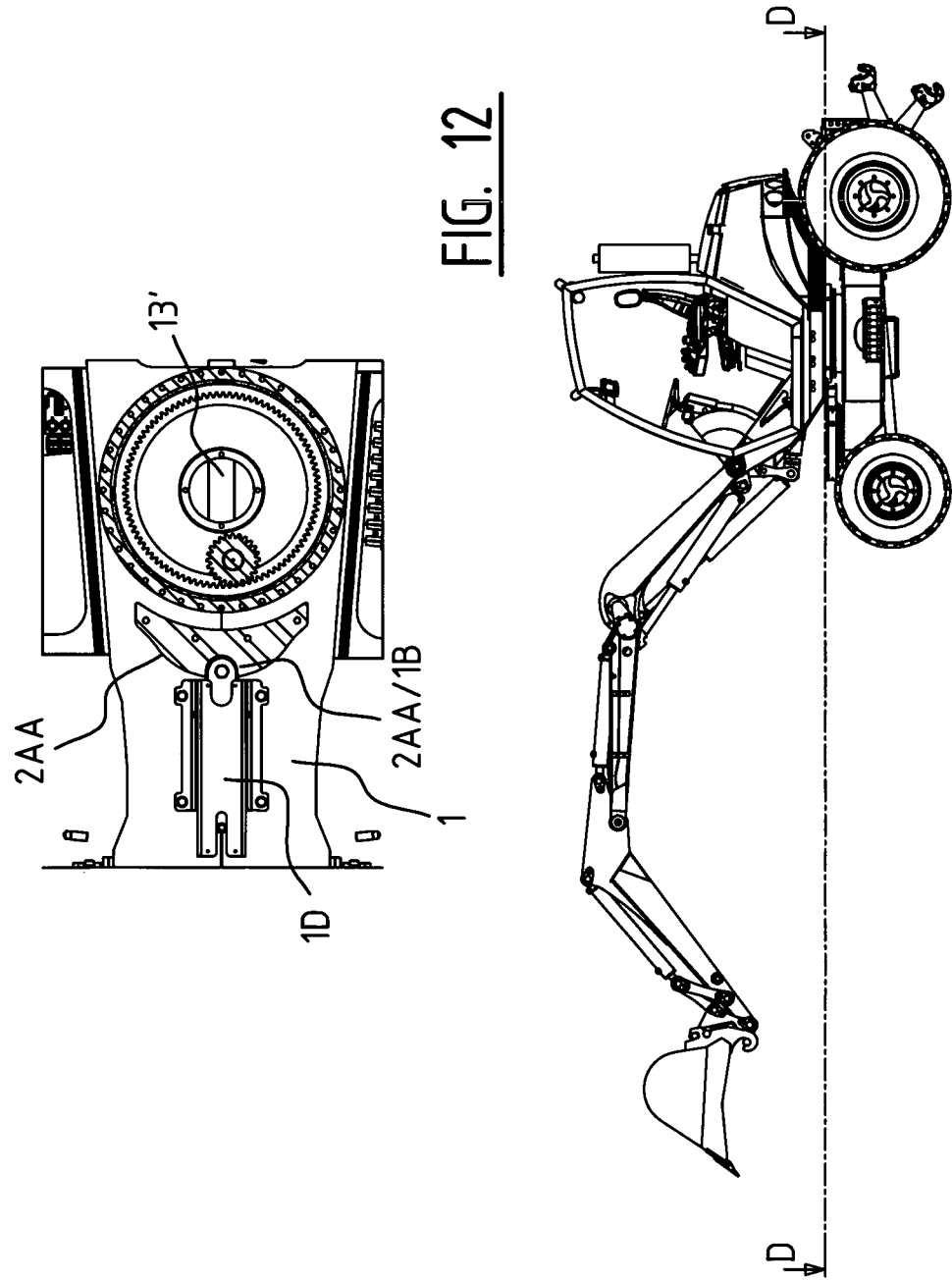

In FIG. 9 the blocking mechanism is not activated and the pin is retracted into a slide track or pin holder. FIGS. 10 to 12 illustrate an embodiment of a blocking mechanism which is in activated mode. The activation of the pin with spring mechanism can preferably be controlled from the cab.

Shown in FIG. 10 is an optional rotation point 1C of an optional guide wheel which can be arranged at the front of the pin as well as the slide track 1T for the pin with rotation point 1C. Such a guide wheel can improve the guiding of the pin relative to the blocking means. The pin/the guide wheel can for instance be pressed by means of a spring mechanism against the blocking means. It can hereby be guided along the guide surface with smooth form of the guide means which comprises at a predetermined position a channel into which the pin can drop/be pressed.

In FIGS. 10, 11 and 12 can be seen that catch 1B runs, pushes or slides against blocking device 2AA. In this situation the blocking is activated by a control instrument, although the blocking device will still have to rotate further with the sub-frame before it is effective.

FIG. 12 shows that channel 2AB lies in line with catch 1B. It can clearly be seen that the shape of catch 1B fits into the shape of channel 2AB and thereby realizes the blocking. In a further embodiment it is also possible for the blocking device 2AA to be positioned not on the sub-frame but on the main frame. In such an embodiment a catch such as 1B will then be positioned on the sub-frame in one way or other. It will be evident that a number of embodiment variants are possible within the specification of the invention.

FIG. 13 shows a mobile apparatus as depicted in FIG. 1 with a foldable arm, wherein this arm is folded wholly together and is in a shortened arm position. Cab 3 is further rotated around axis 100 here and illustrated is that this rotation can take place over for instance an angle of for instance 45, 50, 55, 60, 65, 70, 75, 80, 85 or 90 degrees or more without this being impeded by the folded operating arm, for instance when the operating arm is directed maximally toward the ground.

Described in a first aspect of the present invention is a camp/rollover protection of a mobile apparatus.

An advantage of the articulated arm foldable to a single lifting arm (as for instance described in EP 1 472 416 in the name of applicant) with a configuration of the articulation which is symmetrical or asymmetrical (wherein not all articulations lie substantially in the same line) is a good line of sight, both in the articulated position and in the single short, folded operating arm position. In the articulated position the driver can therefore take up position further to the centre of the apparatus and a relatively larger cab can therefore also be applied than is usual in the prior art, which states that many cabs are positioned further to the left or right relative to the arm. Even on large machines with an articulated arm (from a mass of 10 tons) a very narrow cab is often applied in order to ensure that the overall width of the machine is not too large. A wide cab/rollover protection is an operational advantage and increases the comfort of the driver.

In order to ensure that there is sufficient access to the components under the rollover protection/cab, it must be possible to displace these in one way or other. The prior art states that this is often also on the front side of the machine, both for articulated arms and for single lifting arms. In the prior art with articulated arms it is the case that the cab/rollover protection rotates adjacently of the arm and will not make contact therewith because the arm does not lie in front of the cab. This is not the case for embodiments of the present invention with a wide cab. It is for this reason that the rotation point/rotation axis is placed relatively higher such that during rotation of the cab no contact is made with the articulated arm.

When the articulated arm is folded up to form a single operating arm, the rotation point of this arm is also in the vicinity of (or coincides with) the rotation point of the cab. It is then also the case that during rotation of the cab no contact is made with the single arm. It is then also the case that parts of the folded arm protrude into the space of the cab. A recess (31) is therefore made in the rollover protection/cab which ensures that, also in the single lifting arm position, the arm can rotate freely when the cab is in normal (travel) position. The cab can however rotate and makes no contact here with parts of the arm.

Note that a rotation point with vertical axis is also possible between the sub-frame and the articulated or single lifting arm.

A damping element or damping device can also be applied for this purpose at the rotation point of the cab/rollover protection. This is a new type of suspension. The rotation point of the cab can coincide with the rotation point of the articulated or single lifting arm.

A number of control members (101) (for instance steel springs, gas springs or hydraulic springs) can be used to support the cab during opening/rotation thereof. These reduce the force which must be exerted by the driver. An additional advantage is that the cab hereby 'floats' in the normal operating position, whereby other suspension points are loaded less heavily and less heavy damping is required there.

It is also possible (by applying a very wide cab) to create extra space and lines of sight for the driver. It is thus possible to shift the seat in the width of the machine (see FIG. 5 and FIG. 6). For each of the possible functions (for instance tractor, loading shovel, excavator or mowing arm function) of the operating arm/implement a driver can for instance select an appropriate, possibly different seat position. The driver slides the seat here from the centre to the left or to the right. The steering wheel and/or one or more instrument panels can optionally co-displace with the seat. The steering wheel can be folded upward and can be the only steering wheel.

In order to ensure that there is access to the driver's seat on both sides of the mobile apparatus (often only one side is accessible), one or more instrument panels can be foldable upward (independently of the joystick panel). Such panels can be folded upward independently of the armrests. The steering wheel can be rotated away at a plurality of rotation points, this further increasing the entry space.

It may be further noted that because the rotation point of the cab/rollover protection is relatively high, a determined incline may be necessary on the rear side and partially on the underside of the cab/rollover protection/bottom plate, see component 34. This is necessary for instance for free rotation of components 22 and 23 mounted on the sub-frame.

It is also an advantage for a seal (37) to be placed which can remain active in the case of a resiliently suspended cab/rollover protection because of a correctly chosen and corresponding form of the cab and of the motor space (2, 2A and 37'). The sealing strip (37) is in this way pressed down when the cab moves downward a number of millimetres or centimetres as a result of the suspension. Sound and heat from the motor space in this way does not escape in the direction of the driver as the cab moves up and downward during normal use.

Ergonomic studies have further shown that a machine with a plurality of, for instance four, functions (for instance wheel loader/loading bucket; excavator, tractor and machine with mowing arm) must be very well thought out if the driver is to be able to easily interpret and operate this machine. In the prior art a number of buttons have specific colours. In embodiments the same colours can be employed for a number of safety functions—such as the quick change unit for coupling the implement to the arm, the blocking(s) of the articulations, the blocking of the sub-frame relative to the main frame etc.—on a two-handed control. This means that two buttons must be operated simultaneously to activate a function, one for the right hand and one for the left hand of the driver. In any of our embodiments, for instance for the above functions, a button on an instrument panel can be activated in combination with a button on the joystick to activate and deactivate a safety function. These activated buttons can have an identical colour, so that it is logical for the driver that these two buttons are associated with each other. They must therefore be operated together before the function/safety is activated or deactivated. A further embodiment also actually shows via a screen whether this function/safety has been activated or deactivated. The indication for this function in the screen is then preferably also wholly (or partially) in the colour associated with the colour of the buttons.

Described in another aspect is a method of indicating the height of one of the lifting devices. This can take place by placing a sensor on the lifting device which generates a signal comprising information about this height. The signal can then be displayed on a screen in an absolute value and/or via a gauge. A rotation sensor can further be placed for measuring the angle between the main frame and the sub-frame. The signal from this sensor can be used to display this angle on a screen, wherein the signal is for instance displayed in absolute value as degrees from 0 to 360 degrees. In another embodiment this is also possible with a circle along which degrees are set out and where for instance an arrow indicates the angle. This is very useful because the driver can determine at which angle the sub-frame is operating and when for instance the automatic rotation blocking will come into operation, another aspect of the invention which will be further described below.

Described in another aspect of the present invention is a control for a power takeoff shaft drive for a mobile apparatus. Hydraulic driving of one or more power takeoffs (PTOs) makes it possible to give these power takeoff shafts a rotation speed which does not depend on the rotation speed of the main motor (diesel engine). This means that fuel can be saved when the maximum power of the main motor is not required for the power takeoff shaft. In the prior art there is a direct relation between the main motor and the power takeoff shafts because there is a mechanical transmission between the two. A control can be applied which enables continuous variation of the rotation speed of one or more power takeoff shafts. Electric motors can also be used to drive the power takeoff shafts.

Described in a further aspect of the present invention is the mounting of control units and/or regulating units on or at the main frame.

It is found difficult in practice to make a compact machine which provides space for all mechanical and/or hydraulic and/or electronic and/or electrical components. These components—for the control of the three-point lifting device, the power takeoff shaft(s), the damping or stabilizing of the shafts and/or wheels, and the damping in the articulated or single operating arm—can therefore be accommodated not only in the sub-frame but also at least partially in the main frame. An additional advantage is that owing to these quite heavy components the centre of gravity also comes to lie further downward. It is further also possible for quite a large opening to be provided in one or more sides of the frame of the main frame for passage of the hydraulic hoses and/or electricity cables. These then run from the cab/rollover protection via the sub-frame (2), then via swivel joint (13) with slide contacts (14) via the holes (20 and 20') to the hydraulic and electrical components (19, 26 and 27), and then on to the lifting device (s), the power takeoff shaft(s), motor(s) (16) and the lifting device at the rear or front side of the main frame (1).

Described in a further aspect of the present invention is a system for blocking rotation of a sub-frame relative to a main frame of a mobile apparatus. This embodiment makes it possible that the driver activates the blocking and that, during a rotation of sub-frame relative to main frame, a catch/wheel or similar component drops into a recess. In this way the driver no longer need determine exactly whether the recesses coincide, and he no longer needs to get out of the cab/rollover protection for activation of the rotation blocking.

In the prior art a pin is placed manually by the driver.

Described in a further aspect is the mounting of damping units for the articulated or single operating arm of the main frame. Accumulators (for instance nitrogen-filled cylinders or vessels) are placed here in the main frame because there is more space therein. The conduits/hoses and/or electricity cables can in this case also run via at least one hole in the side of the main frame.

In the description of determined embodiments according to the present invention different features are sometimes grouped in a single embodiment, figure or description thereof, with the purpose of contributing toward the understanding of one or more of the different inventive steps. This may not be interpreted as all features of the group necessarily being present in order to solve a specific problem. Inventive aspects are not to be found in all features of such a group of features present in the description of a specific embodiment.

While some embodiments described herein comprise some but not other features included in other embodiments, combinations or features of different embodiments are intended to be within the scope of the invention and to form different embodiments as would be appreciated by the skilled person.

While the principles of the invention are described above in respect of specific embodiments, it must be clearly understood that this description is made only by way of example and is not limitative for the scope of protection defined by the appended claims.

The invention claimed is:

1. A mobile apparatus, comprising a main frame and a sub-frame connected in rotatable manner to the main frame, a control cab/rollover protection and an operating arm, said operating arm being rotatably connected to the sub-frame through a pivot axis, wherein at least one recess is provided in a lower front part of the rollover protection/cab, said at least one recess being configured for providing space for parts of the operating arm wherein the recess is provided with a wall.

2. The mobile apparatus as claimed in claim 1, wherein the operating arm has a plurality of articulations, wherein the at least one recess is adapted to allow movement therein of parts of the plurality of articulations.

3. The mobile apparatus as claimed in claim 1, wherein the operating arm is a foldable operating arm which, when folded together, results in a single operating arm, wherein the at least one recess is adapted to allow movement therein of a part of the operating arm in the folded position thereof.

4. The mobile apparatus as claimed in claim 3, wherein the operating arm has at least a first, a second and a third articulation, which first articulation is connected at a first end to the sub-frame and at a second end to a first end of the second articulation, and which third articulation has a first end which is connected to a second end of the second articulation and a second end intended for connection to an implement, wherein the at least one recess is adapted to allow movement therein of the first end of the third articulation and of the second end of the second articulation in the folded position of the operating arm.

5. The mobile apparatus as claimed in claim 1, wherein the recess is provided with an at least partially transparent rear wall, this such that the view of an operator in the control cab is improved.

6. The mobile apparatus as claimed in claim 1, wherein the width of the rollover protection/cab is such that the operating arm falls partially or wholly within the width of the rollover protection/cab.

7. The mobile apparatus as claimed in claim 1, wherein the mainframe has a front side, a rear side and a first and opposite second side, wherein one or more openings are arranged on the first side of the main frame through which conduits and/or cables are carried.

8. The mobile apparatus as claimed in claim 1, further comprising at least one power takeoff shaft, wherein the main frame has an outer side, wherein hydraulic valves and/or electronic control units for controlling said at least one power takeoff shaft is placed on said outer side.

9. The mobile apparatus as claimed in claim 8, wherein running to the hydraulic valves and/or electronic control units are conduits and/or cables associated therewith which pass through the one or more openings on the first side of the main frame.

10. A mobile apparatus, comprising a main frame and a sub-frame connected in rotatable manner to the main frame, a control cab/rollover protection and an operating arm, wherein at least one recess is provided in the rollover protection/cab, wherein the recess provides space for parts of the operating arm; wherein the operating arm is mounted on the sub-frame for pivoting around a rotation axis, and wherein the recess is provided with a cylindrical rear wall.

11. The mobile apparatus as claimed in claim 10, wherein the cylindrical rear wall has a central axis substantially coinciding with said rotation axis.

12. A mobile apparatus, comprising a main frame and a sub-frame connected in rotatable manner to the main frame, a control cab/rollover protection and an operating arm, wherein at least one recess is provided in the rollover protection/cab, wherein the recess provides space for parts of the operating arm; wherein the control cab/rollover protection is mounted on the sub-frame for pivoting around a first rotation axis, and wherein the operating arm is mounted on the sub-frame for pivoting around a second rotation axis, and wherein the first rotation axis lies close to the second rotation axis or substantially coincides with the second rotation axis.

13. The mobile apparatus as claimed in claim 12, wherein the first and the second rotation axis lie within a distance of 60 cm from each other.

14. The mobile apparatus as claimed in claim 12, wherein the second rotation axis is oriented substantially horizontally or is oriented substantially vertically.

15. The mobile apparatus as claimed in claim 14, wherein the operating arm of the mobile apparatus comprises a further horizontal or a vertical rotation axis arranged close to the second rotation axis which is respectively of the vertical or horizontal type, and wherein the second and further rotation axis of the operating arm are arranged in the vicinity of the first rotation axis of the rollover protection/cab.

16. The mobile apparatus as claimed in claim 12, wherein a suspension point associated with the first rotation axis about which the rollover protection/cab rotates comprises a damping device.

* * * * *